United States Patent
Gannamaneni et al.

(10) Patent No.: US 12,269,359 B2
(45) Date of Patent: Apr. 8, 2025

(54) METHOD AND SYSTEM FOR VEHICLE-TO-VEHICLE CHARGING OF ELECTRIC VEHICLES

(71) Applicant: Volvo Car Corporation, Gothenburg (SE)

(72) Inventors: Narendar Rao Gannamaneni, Gothenburg (SE); Arsam Golriz, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 554 days.

(21) Appl. No.: 17/739,297

(22) Filed: May 9, 2022

(65) Prior Publication Data

US 2022/0379744 A1 Dec. 1, 2022

(30) Foreign Application Priority Data

May 25, 2021 (EP) .................................... 21175654

(51) Int. Cl.
| | |
|---|---|
| *B60L 53/22* | (2019.01) |
| *B60L 53/10* | (2019.01) |
| *B60L 53/53* | (2019.01) |
| *B60L 53/57* | (2019.01) |
| *B60L 53/66* | (2019.01) |

(Continued)

(52) U.S. Cl.
CPC .............. *B60L 53/22* (2019.02); *B60L 53/11* (2019.02); *B60L 53/53* (2019.02); *B60L 53/57* (2019.02); *B60L 53/66* (2019.02); *H02J 7/0013* (2013.01); *H02J 7/342* (2020.01)

(58) Field of Classification Search
CPC ...................................................... B60L 53/22
See application file for complete search history.

(56) References Cited

U.S. PATENT DOCUMENTS

| | | | |
|---|---|---|---|
| 2013/0020993 A1* | 1/2013 | Taddeo | .................. B60L 53/65 |
| | | | 320/109 |
| 2016/0079776 A1* | 3/2016 | Iguchi | .................... H02M 3/06 |
| | | | 320/134 |

(Continued)

FOREIGN PATENT DOCUMENTS

| | | |
|---|---|---|
| WO | 2013009178 A2 | 1/2013 |
| WO | 2019026095 A1 | 2/2019 |

OTHER PUBLICATIONS

Oct. 14, 2021 European Search Report issued in Corresponding U.S. Appl. No. 21/175,654.

(Continued)

*Primary Examiner* — Jerry D Robbins
(74) *Attorney, Agent, or Firm* — Clements Bernard Walker; Christopher L. Bernard (57) ABSTRACT

A method for vehicle-to-vehicle charging for electric vehicles, including: controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle; transferring the DC power from the first terminal L1 of the first electric vehicle to an energy storage system of a second electric vehicle, and from the second terminal L2 of the first electric vehicle to an energy storage system of a third electric vehicle.

14 Claims, 5 Drawing Sheets

(51) Int. Cl.
*H02J 7/00* (2006.01)
*H02J 7/34* (2006.01)

(56) References Cited

U.S. PATENT DOCUMENTS

2016/0368390 A1* 12/2016 Yang ..................... B60L 15/025
2022/0097540 A1* 3/2022 Atluri ................... H02J 7/0048
2024/0424943 A1* 12/2024 Prasad .................... B60L 53/20

OTHER PUBLICATIONS

Anonymous: "Vehicle Electrification: Technologies, Challenges, and a Global Perspective for Smart Grids I IntechOpen", Nov. 27, 2019, pp. 1-26.

* cited by examiner

METHOD AND SYSTEM FOR VEHICLE-TO-VEHICLE CHARGING OF ELECTRIC VEHICLES

CROSS-REFERENCE TO RELATED APPLICATION

The present disclosure claims the benefit of priority of co-pending European Patent Application No. 21 175 654.9, filed on May 25, 2021, and entitled "METHOD AND SYSTEM FOR VEHICLE-TO-VEHICLE CHARGING OF ELECTRIC VEHICLES," the contents of which are incorporated in full by reference herein.

TECHNICAL FIELD

The present disclosure relates to a method for vehicle-to-vehicle charging of electric vehicles, an electric vehicle configured to carry out such a method, a use of a multiport unit in such an electric vehicle and a system for such a vehicle-to-vehicle charging.

BACKGROUND

In the prior art, electric vehicles are well known including an electric train used to drive the electric vehicle. This electric drive train is supplied with energy by an electric energy storage system. From time to time, this energy storage system must be charged with electrical energy, which can be done, e.g., at home or a charging station where the electric vehicle can be connected to an electrical grid via a charging cable for AC charging, e.g., a Type 2/Type 1 charging cable. For this purpose, an electric vehicle usually includes an AC-DC on-board charger to allow charging of the energy storage system, e.g. Lithium-Ion batteries. To do this, the AC power is supplied to the on-board charger from the power grid and the on-board charger converts the AC power into a DC power that can be used to charge the energy storage system of the electric vehicle.

However, one of the main issues of this technology is still the limited range of electric vehicles, wherein a particular issue is considered to be the risk that the electric vehicle could run out of electric charge in a remote location where there is no access to a charging station. A possible solution to reduce this issue is to provide a vehicle-to-vehicle charging. Such a possibility allows an electric vehicle to charge another vehicle, typically via its on-board chargers. For this purpose, a possible source vehicle, the electric vehicle acting as an energy source, must include a bi-directional on-board charger that allows current to flow both into and out of the electric vehicle. Such an electric vehicle including a bi-directional on-board charger is able to supply AC power to the input/interface of the electric vehicle and, via a charging cable, may supply the load electric vehicle, the elective vehicle with an empty battery, with electricity. The on-board charger of the load electric vehicle can be either also a bi-directional or a unidirectional on-board charger.

SUMMARY

In view of this, it is found that a further need exists to improve a vehicle-to-vehicle charging. In particular there is a further need to increase the charging efficiency when charging from vehicle-to-vehicle.

In the view of the above, it is an object of the present disclosure to provide a method and a system allowing an improved vehicle-to-vehicle charging. It is in particular an object of the present disclosure to provide an increased charging efficiency when charging from vehicle-to-vehicle.

These and other objects, which become apparent upon reading the following description, are solved by the subject matter of the independent claims. The dependent claims refer to preferred embodiments of the disclosure.

According to a first aspect, a method for vehicle-to-vehicle charging of electric vehicles may be provided, including the following steps: controlling a bi-directional on-board charger of a first electric vehicle to provide a DC power from an energy storage system of the first electric vehicle at an electric vehicle inlet of the first electric vehicle; transferring the DC power to an electric vehicle inlet of a second electric vehicle; transferring the DC power from the electric vehicle inlet of the second electric vehicle directly to an energy storage system of the second electric vehicle.

Figure 1:
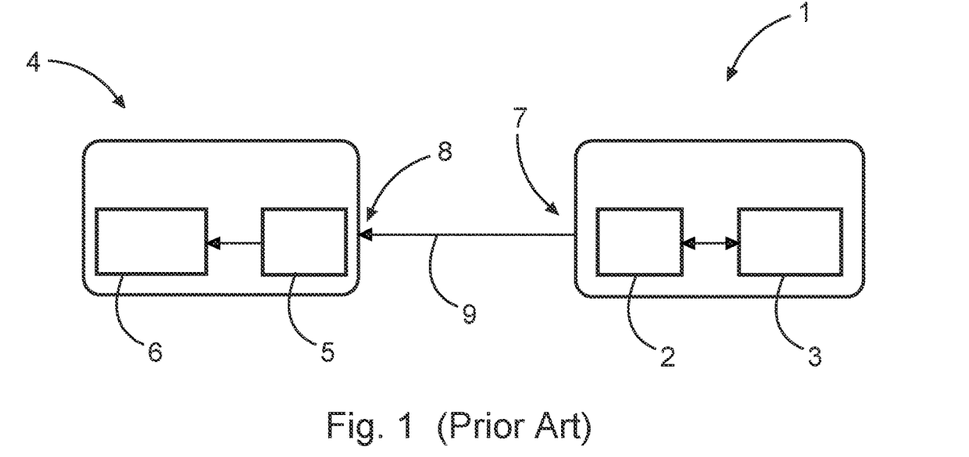
FIG. 1 is a schematic view of known vehicle-to-vehicle charging through the on-board chargers of a load electric vehicle and a source electric vehicle.

The present disclosure is based on the finding that in a known vehicle-to-vehicle charging situation, the efficiency of such a charging is comparable low due to the losses when directing the charge through the on-board chargers of both electric vehicles in the intended way, i.e. converting the DC power of the energy storage system of the source electric vehicle into an AC power providing it to the AC inlet of the source electric inlet and converting the transmitted AC power in the load electric vehicle into a DC power for charging the energy storage system of the load electric vehicle. In FIG. 1, a schematic illustration of such a known vehicle-to-vehicle charging situation is shown. For example, in case a source electric vehicle 1 includes an 11 kW bi-directional on-board charger 2 connected to an energy storage system 3, e.g. a high voltage battery 3, and a load electric vehicle 4 includes an 11 kW uni-directional on-board charger 5 connected to an energy storage system 6, e.g. a high voltage battery 6. The source electric vehicle 1 provides AC power at its AC inlet 7, which is transmitted to the AC inlet 8 of the load electric vehicle 4 via a charging cable 9. Thereby, the load electric vehicle 4 may charge its energy storage system 6, similar to when the load electric vehicle 4 would be connected to a power grid via a charging station. In praxis, the typical efficiency for known uni-directional on-board chargers and known bi-directional on-board chargers are around 94%. Thus, in such an example, the overall efficiency during this charging will be 0.94× 0.94=0.883, i.e. 88.3%, wherein cable losses are negligible relative to the losses in the on-board chargers. As a result, in such a system about 12% losses may occur, i.e. 6% from each on-board charger.

In contrast to this known vehicle-to-vehicle charging, the present disclosure proposes to provide a DC power to the AC inlet of the first electric vehicle and to bypass the on-board charger of the second electric vehicle such that the DC power of an insulated DC-DC converter of the first on-board charger may be directly provided to the energy storage system of the second electric vehicle. In an example, a DC power may be provided to the AC inlet of the first electric vehicle by controlling the bi-directional on-board charger of the first electric vehicle to provide DC power from the energy storage system of the first electric vehicle by switching the switches of a power factor correction unit of the bi-directional on-board charger of the first electric vehicle such that that at least a DC+ and a DC− line being provided at AC inlet of the first electric vehicle. Thereby, it is possible that the provide DC power bypasses the on-board charger of the second electric vehicle and the DC power provided by the first/source electric vehicle may charge a high voltage battery of the second electric vehicle. Thereby a higher overall charging system efficiency may be provided. For example, in the above mentioned example, the efficiency may remain at 94%, i.e. 6% higher than the efficiency in the conventional charging method.

In an implementation, the step of controlling the bi-directional on-board charger of a first electric vehicle to provide a DC power from the energy storage system of the first electric vehicle at an electric vehicle inlet may include: controlling a charging current by the bi-directional on-board charger of the first electric vehicle. In an example, a data/control communication may be provided by means of a Powerline Communication (PLC) or CAN communication. The on-board charger of the first vehicle may control the charging current to the second/load electric vehicle by regulating the primary side of its isolated DC-DC converter, wherein the Powerline Communication protocol can be used to facilitate the charging between the electric vehicles.

In an implementation, the charging current may be controlled by controlling an isolated DC-DC converter of the bi-directional on-board charger of a first electric vehicle. In the known vehicle-to-vehicle charging, the on-board charger of the source electric vehicle may generate AC power which is fed to the load electric vehicle. However, in this implementation the source vehicle may generate DC power using the same topology. The generated DC power may then fed to the load electric vehicle's high voltage battery directly, rather than having to pass through its on-board charger. The on-board charger of the source electric vehicle may control the charging current to the first electric vehicle by regulating the primary side its isolated DC-DC converter.

In an implementation, the second electric vehicle may include a DC inlet, preferably being selected from: a CCS interface, a CHAdeMO interface and/or a GB/T interface. These interfaces include a DC inlet allowing to bypass the on-board charger of the second electric vehicle and directly provide the DC power to the energy storage system of the second electric vehicle.

In an implementation, the bi-directional on-board charger may include at least one power factor correction unit and at least one isolated DC-DC converter.

According to a second aspect, an electric vehicle may be provided which is configured to carry out a method described above, including: at least one bi-directional on-board charger including at least one power factor correction unit and at least one isolated DC-DC converter; the power factor correction unit including switches configured to be switched such that from the isolated DC-DC converter to the electric vehicle inlet at least a DC+ and a DC− line being provided.

According to a third aspect, a use of an on-board charger is proposed including at least one power factor correction unit and at least one isolated DC-DC converter in an electric vehicle described above. A further aspect relates to a use of a charging cable for connecting two electric vehicles in a method described above.

A further aspect relates to a control unit for controlling a bi-directional on-board charger of an electric vehicle to provide DC power from the energy storage system of the electric vehicle at an electric vehicle inlet configured to switch the switches of a power factor correction unit of the bi-directional on-board charger to provide at least a DC+ and a DC− line at the electric vehicle inlet of the electric vehicle. A further aspect relates to a computer program element which when executed by a processor is configured to carry out a method described above.

Moreover, a further aspect relates to a system for a vehicle-to-vehicle charging configured to carry out the method for charging vehicle-to-vehicle described above, including: a bi-directional on-board charger of a first electric vehicle; an energy storage system of the first electric vehicle; an energy storage system of a second electric vehicle; a control unit configured to control the bi-directional on-board charger of the first electric vehicle to provide a DC power from the energy storage system of the first electric vehicle at an electric vehicle inlet of the first electric vehicle; a charging cable configured to transfer the DC power to an electric vehicle inlet of a second electric vehicle; an on-board charger of the second electric vehicle configured to transfer the DC power from the electric vehicle inlet of the second electric vehicle directly to an energy storage system of the second electric vehicle. In an implementation of the system, the control unit may be configured to control the charging of the energy storage system of the second electric vehicle.

A further aspect relates to a method for vehicle-to-vehicle charging for electric vehicles, controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle; transferring the DC power from the first terminal L1 of the first electric vehicle to an energy storage system of the second electric vehicle, and from the second terminal L2 of the first electric vehicle to an energy storage system of the third electric vehicle. This may be advantageous as two electric vehicles (i.e. the second and the third electric vehicle) may be charged in parallel by one electric vehicle, i.e. the first vehicle. In this aspect, all above explained explanations with respect to the electric vehicles, the specifics of the bi-directions on board charger of the first electric vehicle also apply here. In the following, only the specifics with respect to this aspect, i.e. a method for charging more than one vehicle by means of the first vehicle, are explained in more detail.

In an implementation, the second electric vehicle and the third electric vehicle are charged simultaneously.

In an implementation, a voltage range of the energy storage system of the second electric vehicle and of the third electric vehicle is smaller than a voltage range of the energy system of the first electric vehicle.

In an implementation, the voltage range of the energy storage system of the second electric vehicle and the voltage range of the energy storage system of the third electric vehicle are different.

In an implementation, the first electric vehicle is connected to the second electric vehicle and to the third electric vehicle by means of one multi-port unit, wherein the multi-port unit includes a common neutral conductor and wherein the multi-port unit is configured to provide a communication between the first electrical vehicle and the second electrical vehicle and the third electrical vehicle. The term communication means, as used herein, the exchange of data (e.g. control signal) and electric energy.

In an implementation, the energy storage system of a fourth electrical vehicle is charged by the first electrical vehicle simultaneously to the second electrical vehicle and third electrical vehicle.

A further aspect relates to a system for a vehicle-to-vehicle charging configured to carry out the method for charging vehicle-to-vehicle as described above, including: a three phase bi-directional on-board charger of a first electric vehicle; an energy storage system of the first electric vehicle; an energy storage system of a second electric vehicle; an energy storage system of a third electric vehicle; a multi-port unit configured to connect the three phase bi-directional on-board charger of the first electric vehicle and the energy storage system of the second electric vehicle and the energy storage system of a third electric vehicle; a control unit configured to control the three phase bi-directional on-board charger of the first electric vehicle to provide a DC power from the energy storage system of the first electric vehicle at a first terminal L1 and a second terminal L2 of the three phase bi-directional on board-charger of the first electric vehicle.

A further aspect relates to a use of a multi-port unit in a method as described above or in a system as described above.

In another implementation, a method for vehicle-to-vehicle charging for electric vehicles is provided, including: controlling a three phase bi-directional on-board charger of a first electric vehicle to provide a DC power from an energy storage system of the first electric vehicle at a first terminal L1 (40) of the three phase bi-directional on board-charger, transferring the DC power from the first terminal L1 (40) of the first electric vehicle to an energy storage system (34) of the second electric vehicle. E.g. the first electric vehicle has a 800V energy storage system and the second electric vehicle has a 400V energy storage system. The switches of the three phase bi-directional on board charger are switched such that the L2 and L3 phases are connected to L1. A DC-DC converter of the three phase bi-directional on-board charger may operate as a regulated 800V-400V DC-DC converter and may charge the energy storage system of the second vehicle. A L1 phase terminal and a neutral terminal may be connected to the DC+ and DC– terminal of the energy storage system of the second vehicle in order to charge the 400 Volt energy storage system. In other words, the three phase bi-directional on board charger is used as step-down converter here.

BRIEF DESCRIPTION OF THE DRAWINGS

In the following, the disclosure is described exemplarily with reference to the enclosed figure, in which.

Notably, the figures are merely schematic representations and serve only to illustrate an embodiment of the present disclosure. Identical or equivalent elements are in principle provided with the same reference signs.

DESCRIPTION OF EMBODIMENTS

Figure 2:
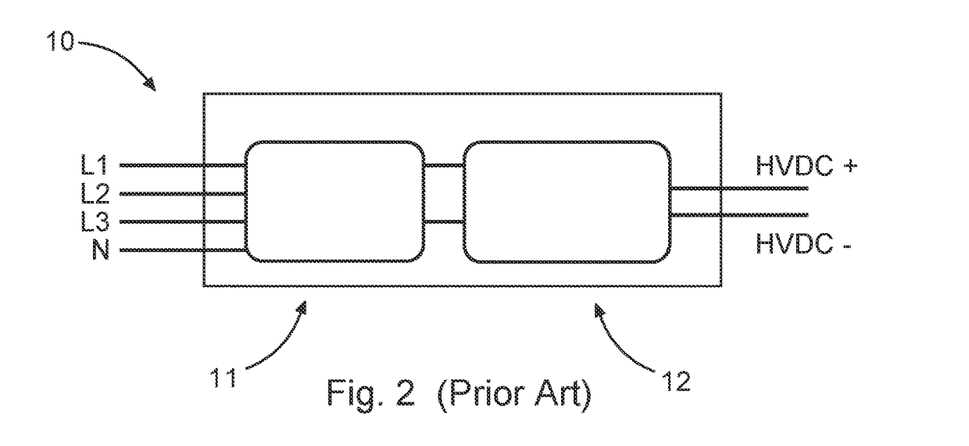
FIG. 2 is a schematic view of a known bi-directional on-board charger including a power factor correction and an isolated DC-DC converter.

FIG. 2 is a schematic view of a known bi-directional on-board charger 10 including a power factor correction (PFC) 11 and an isolated DC-DC converter 12 which can be used in both the first/source electric vehicle and the second/load electric vehicle. A known on-board charger has two stage power conversion. The first stage may be connected to AC power grid and is responsible for keeping the power factor close to unity while charging, also known as power factor correction (PFC) 11. The second stage is an isolated DC-DC converter 12, which may regulate the current and voltage in order to charge an energy storage system 3, e.g. a high-voltage (HV) battery 3, as shown in FIG. 1. Apart from controlling the charging operation, the second stage also provides isolation from the AC input, and is typically implemented as a full bridge LLC resonator or phase shifted full bridge circuit.

Figure 3:
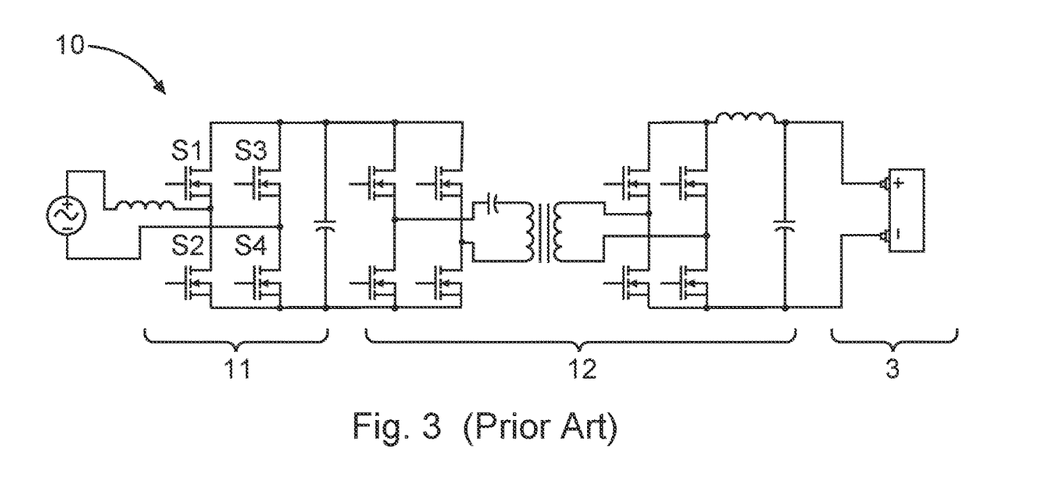
FIG. 3 is a schematic topology of a single-phase bi-directional on-board charger.

FIG. 3 is a schematic topology of the single-phase bi-directional on-board charger 10. The power stages for both uni-directional and bi-directional are principally the same, but in bi-directional operation a power factor correction 11 may generate either three phase or single phase AC voltages. To achieve bi-directionality from the same power stages, the bi-directional on-board charger 10 may be equipped with active switches S1-S4 instead of diodes usually used in uni-directional on-board chargers.

Figure 4:
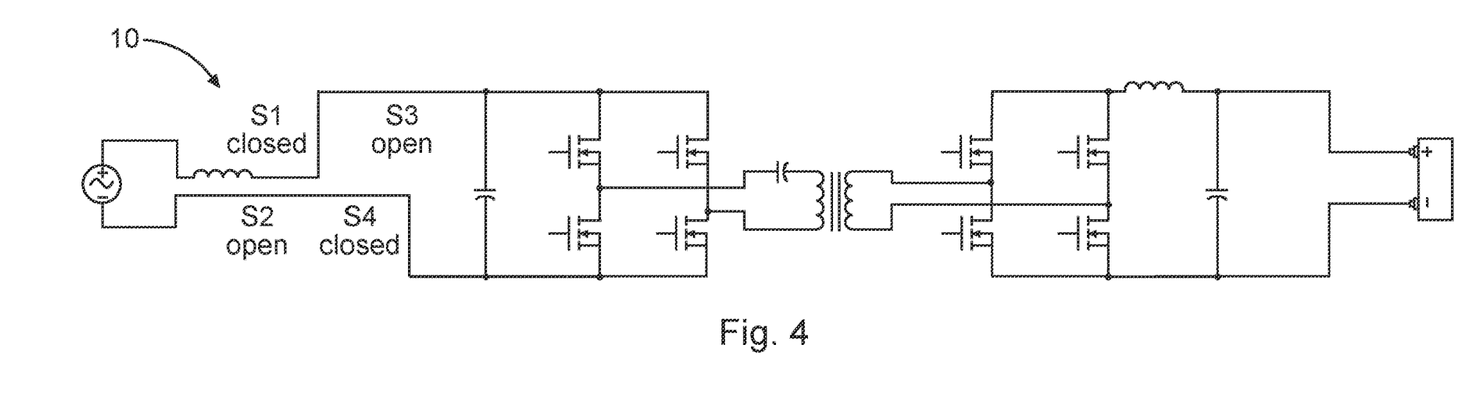
FIG. 4 is a schematic view of an on-board charger of a source electric vehicle used in an embodiment of to the present disclosure.

In known vehicle-to-vehicle charging, the on-board charger 10 inside the first/source electric vehicle generates AC power, which is fed to the second/load electric vehicle. However, in the shown embodiment, it is proposed that the source vehicle generates DC power using the same topology by permanently closing the power factor correction 11 MOSFETs S1 and S4, or S2 and S3. Thereby, the power factor correction 11 MOSFETs may be used as two wires to connect to the isolated DC-DC converter 12 primary side. The equivalent circuit after closing the MOSFETs S1 and S4 is shown in FIG. 4. Now the switches S1 and S4 switch lines may act as DC+ and DC–, respectively. Similarly by closing the MOSFETs S2 and S3 and opening S1 and S4, the on-board charger 10 may generate DC power but in the opposite polarity. Either of these combinations can be used.

The generated DC power may then be fed to the second electric vehicle's HV battery directly, rather than having to pass through its on-board charger. The on-boards charger of the first vehicle may control the charging current to the first electric vehicle by regulating the primary side of its isolated DC-DC converter shown in FIG. 4. In this respect, a Powerline Communication or CAN communication may be used DC charging, and can be used to facilitate the charging between the electric vehicles. In this way, the electric power from the first vehicle will only pass through one on-board charger and thereby the power losses can be reduced to half. Such an implementation is compatible with both single and three phase configurations. If there are three phases, the AC side of the on-board charger may be reconfigured to single phase through the use of AC relays in order to transfer full power. There are no additional components or modules required in the shown implementation.

In an implementation, the second electric vehicle may include a DC inlet, preferably being selected from: a CCS interface, a CHAdeMO interface and/or a GB/T interface. These interfaces include a DC inlet allowing to also bypass the on-board charger of the second electric vehicle and directly provide the DC power to the energy storage system of the second electric vehicle. In this respect, it is preferred that the connector between the two electric vehicles includes a Type 2/Type 1 interface to the source electric vehicle and a CCS DC/CHAdeMO/GBT DC interface to the load electric vehicle.

Figure 5:
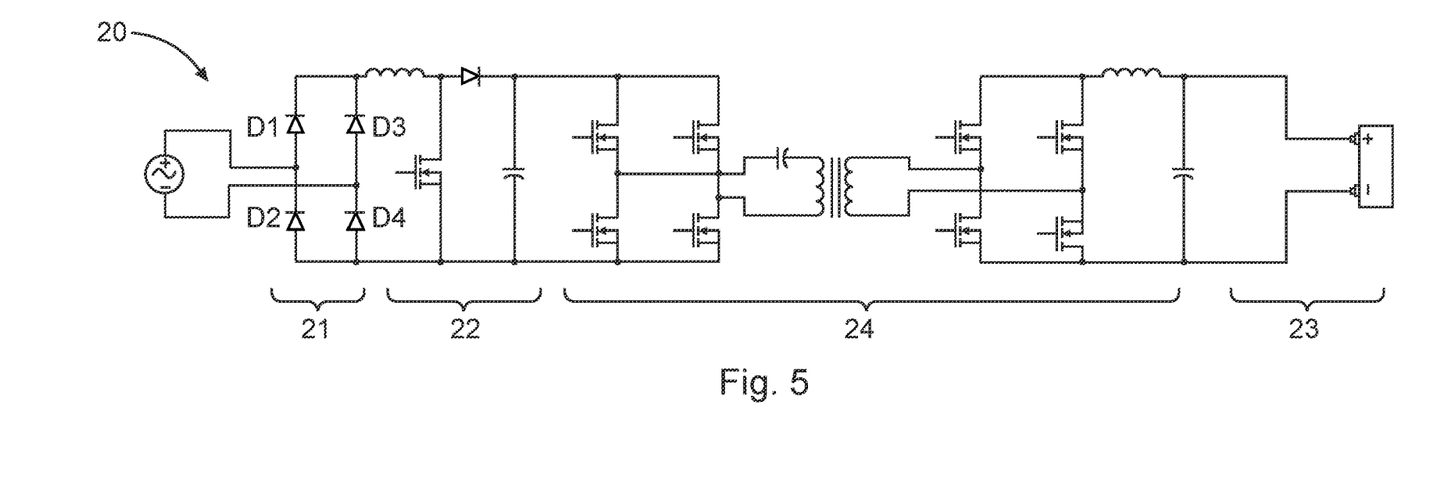
FIG. 5 is a schematic view an on-board charger of a load electric vehicle used in an embodiment of the present disclosure.

However, it is also possible that the parties use a conventional Type 2/Type 1 charging cable, which usually comes standard with most electric vehicles. In such a situation, the DC power from source electric vehicle may transfer electric power through an on-board charger 20 of a load electric vehicle as shown in FIG. 5. The load electric vehicle may still have either a uni-directional or a bi-directional on-board charger. If the load electric vehicle is using a known uni-directional diode rectifier 21, once the DC power is applied, the diodes D1 and D4 or D2 and D3 will conduct depends on the polarity of voltage. The power factor correct 22 MOSFETs may be turned off as the voltage on the load electric vehicle's input is already high enough to charge the energy storage system, e.g. the high voltage battery 23 and it can be fully regulated by the source electric vehicle's on-board charger, when used as shown in FIG. 4. After the power factor corrector 22 capacitor, the power may flow through the isolated DC-DC converter 24 of the load electric vehicle to charge the high voltage battery 23 of the load electric vehicle. In such a way, the load electric vehicle on-board charger 20 may be also used as DC-DC converter 24 but the overall charging efficiency is in practice just under 90%.

Figure 6:
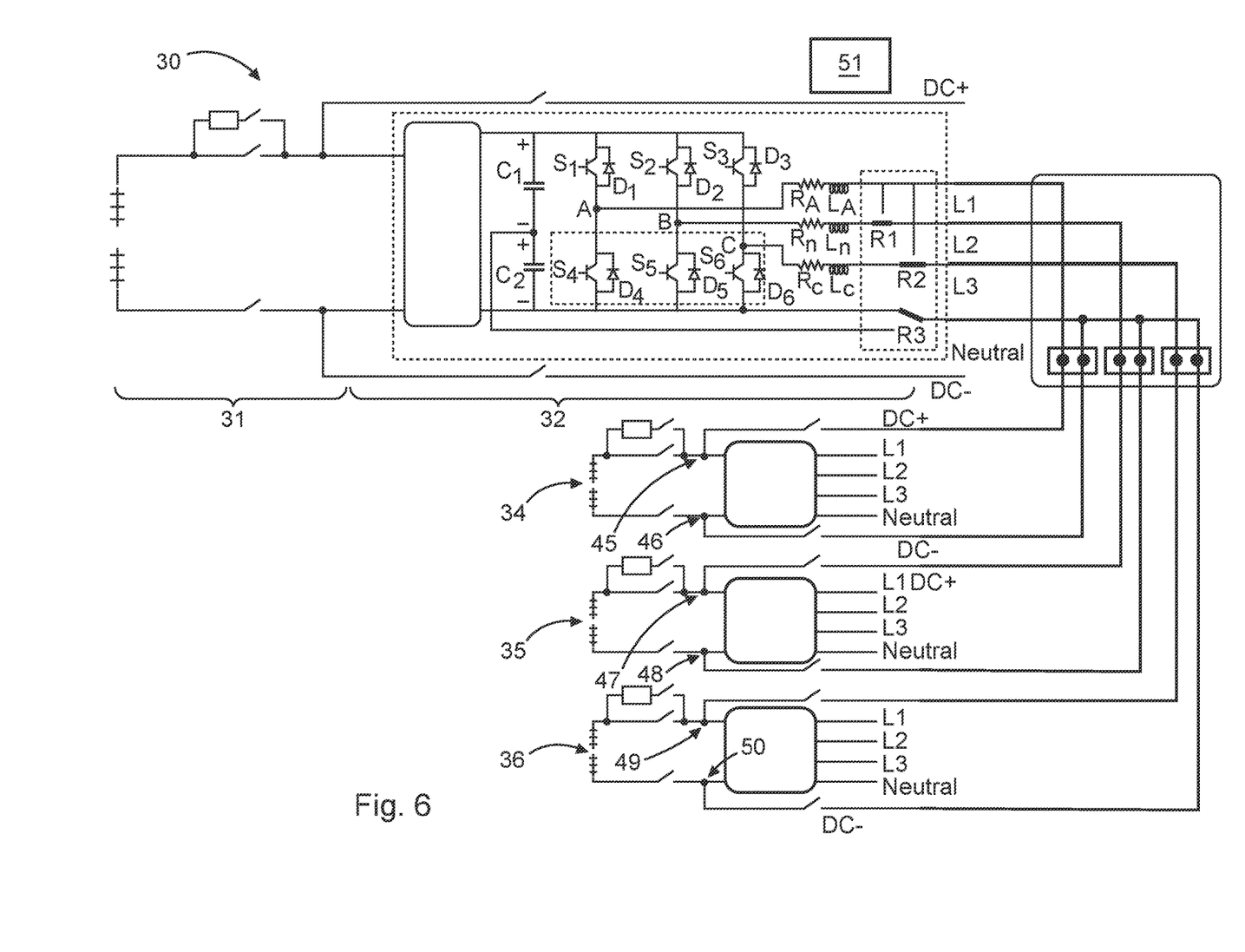
FIG. 6 is a schematic view of a system used in an embodiment of the present disclosure.

FIG. 6 is a schematic view of a system 30 used in an embodiment of the present disclosure. The system is used for a vehicle-to-vehicle charging configured to carry out a method as described above. The system 30 includes a three phase bi-directional on-board charger (32) of a first electric vehicle, an energy storage system (31) of the first electric vehicle, an energy storage system (34) of a second electric vehicle, an energy storage system (35) of a third electric vehicle, a multi-port unit (33) configured to connect the three phase bi-directional on-board charger (32) of the first electric vehicle and the energy storage system (34) of the second electric vehicle and the energy storage system (35) of a third electric vehicle, a control unit (51) configured to control the three phase bi-directional on-board charger (32) of the first electric vehicle to provide a DC power from the energy storage system (31) of the first electric vehicle at a first terminal L1 (40) and a second terminal L2 (41) of the three phase bi-directional on board-charger (32) of the first electric vehicle. The three phase bi-directional on board-charger (32) includes further a third terminal L3 (42) and a neutral conduction terminal (43). The first terminal L1 (40), the second terminal L2 (41), the third terminal L3 (42) relate each to one of the phases L1, L2, L3 of the three phase on board charger (32). The first terminal L1 (40), the second terminal L2 (41), the third terminal L3 (42) are each connected to the multi-port unit (33). The multi-port unit (33) includes a common neutral conductor (44), which is connected to the neutral conduction terminal (43). The multi-port unit (33) is configured to provide a communication between the first electric vehicle, the second electric vehicle, the third electric vehicle, and the fourth electric vehicle. To charge the second energy storage system (34), the third energy storage system (35), and the fourth energy storage system (36), the following switch process in the three phase on board charger (32) is carried out. The switches S1, S4 & inductor LA, which operates as a step-down converter, are connected to L1. Similarly, other two step-down DC-DC converters are formed by using S2,S5 & LB connected to L2 and the switches S3, S6 & LC connected to L3. These three step-down DC-DC's are independently capable of charging three vehicles with common return path through the neutral terminal. The relays R1 & R2 are switched such that L2 & L3 phases are independent from L1. The relay R3 is connected to the common source point of the switches S4,S5 & S6. The terminals L1,L2,L3 & Neutral are connected to the multi-port unit (33) from which three output ports are formed with a common neutral point for return current. The multi-port unit is connected to the DC+ & DC− (45, 46) of the second electric vehicle, to the DC+ & DC− (47, 48) of the third electric vehicle, and to the DC+ & DC− (49, 50) of the fourth electric vehicle in order to charge the energy storage system (34) of the second electric vehicle, the energy storage system (35) of the third electric vehicle, the energy storage system (36) of the fourth electric vehicle. This multi-port unit (33) is used to connect the three different electric vehicles at the same time to the first electric vehicle. The first electric vehicle can charge the three electric vehicles, which may have different voltages, which depends on state of charge of each electric vehicle. The communication between the first vehicle to other vehicles may also be taken care by multi-port unit (33).

Figure 7:
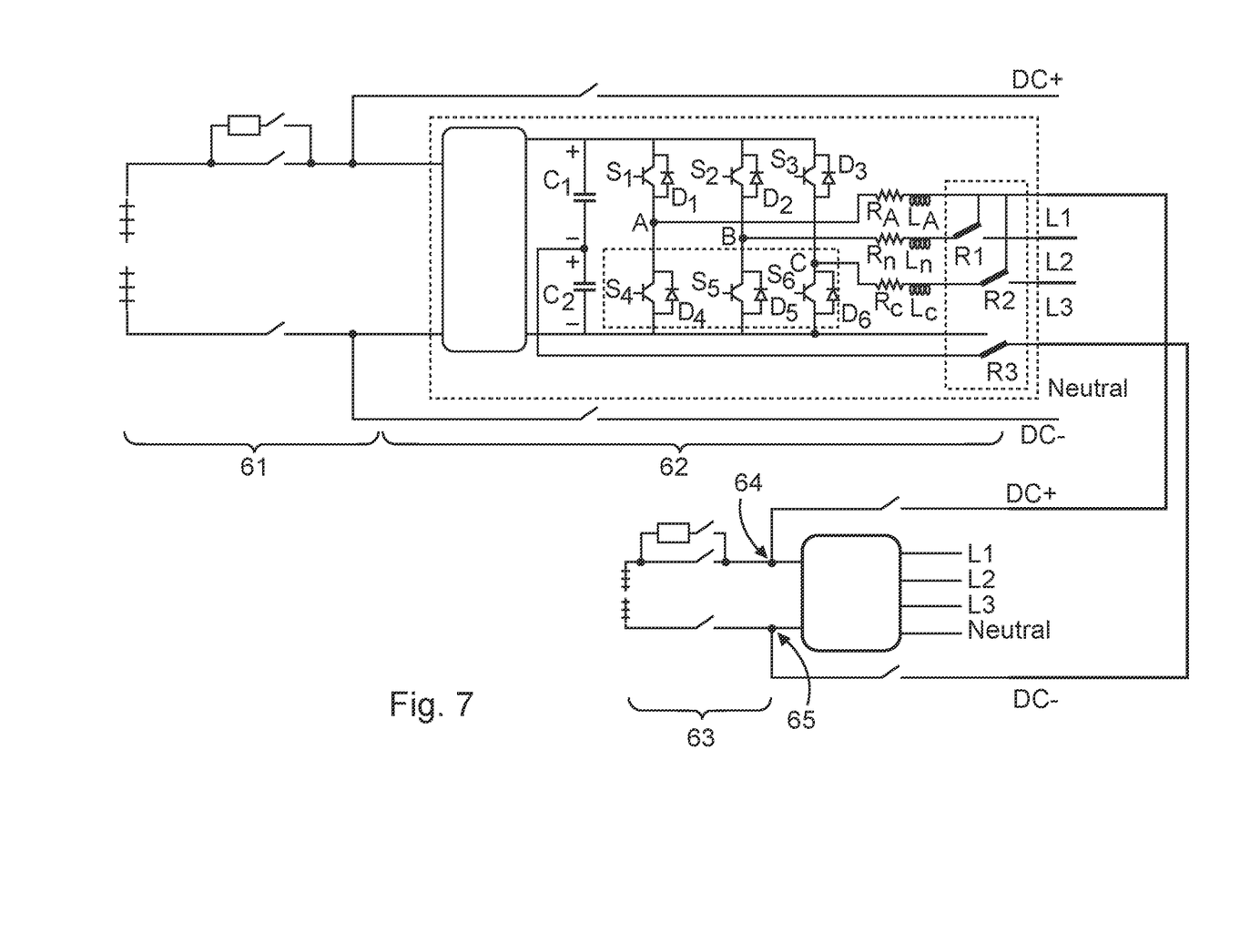
FIG. 7 is a schematic view of a three phase on board charger of a first electric vehicle used to charge a second electric vehicle.

FIG. 7 is a schematic view of a three phase on board charger (62) of a first electric vehicle used to charge an energy storage system (63) of a second electric vehicle. The energy storage system (61) of the first electric vehicle has 800V. The energy storage system (63) of the second electric vehicle has 400V. The three-phase full bridge semiconductor switches S1, S2 & S3 are turned-ON and the relays R1 & R2 are switched such that L2 & L3 phases are connected to L1. The relay R3 is connected to mid-point of two capacitors. Each capacitor is rated for at least 500V. In this case, the DC-DC converter of three phase on-board charger inside first electric vehicle operates as a regulated 800V-400V DC-DC converter and charges the second electric vehicle, which is having 400V battery. The first vehicle L1 & Neutral terminals are connected to DC+ & DC− (64, 65) of the second electric vehicle in order to charge the 400V energy storage system (63). The main contactors 2 & 3, DC charging contactors 4 & 5 inside the second vehicle are turned ON to charge the 400V energy storage system (63).

Figure 8:
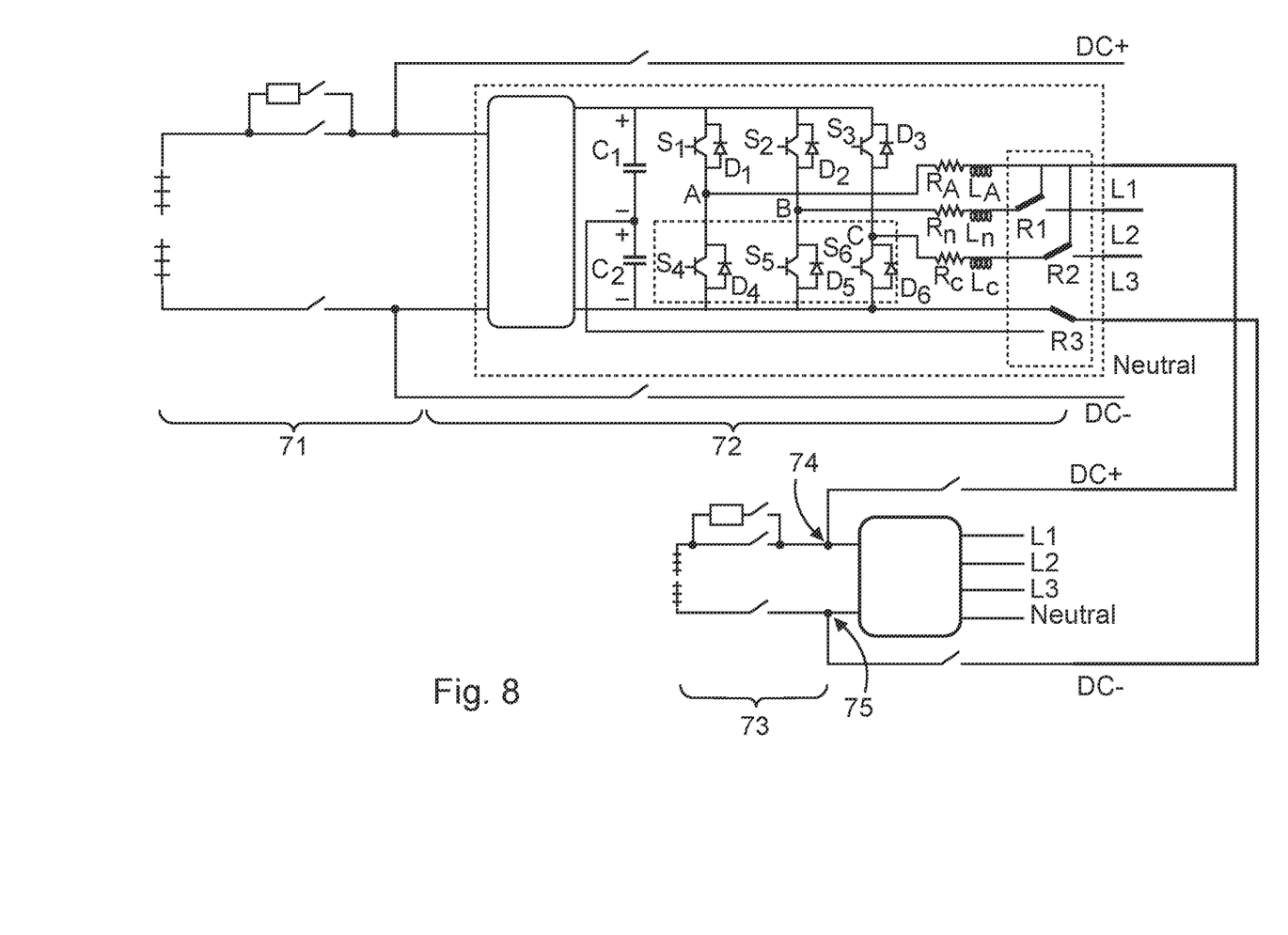
FIG. 8 is another schematic view of a three phase on board charger of first vehicle used to charge a second electric vehicle.

FIG. 8 is another schematic view of a three phase on-board charger (72) of first vehicle used to charge a second electric vehicle. In comparison to the description presented in FIG. 7, the three phase on-board charger does not support the full voltage range of the energy storage system of the second electric vehicle. For this operation, the relays R1 & R2 are switched to connect to L1, relay R3 is switched to connect to the common source point of S4, S5 & S6. The switches S1, S4 & inductor $L_A$ together operated as a first step-down DC-DC converter. The switches S2, S5 & inductor $L_B$ together operated as a second step-down DC-DC converter and S3, S6 & inductor $L_C$ operated as a third step-down DC-DC converter. These three step-down converters are connected to L1, and there will be a 120 deg. phase shift angle between them to reduce the inductor current ripple. The three phase on-board charger of the first electric vehicle operates as a two stage DC-DC converter to charge the energy storage system (73) of the second electric vehicle with any voltage range window either it can be a 400V energy voltage system or a 800V energy storage voltage system as long as the actual energy storage system voltage of the second electric vehicle is always lower than actual energy storage system voltage of the first electric vehicle. The first electric vehicle L1 & Neutral terminals are connected to DC+ & DC− (74, 75) of the second electric vehicle in order to charge the 400V energy storage system (73). The first electric vehicle can also charge from a second electric vehicle. In this case, the switches S1, S4 & inductor $L_A$ operates as a first step-up DC-DC converter. The switches S2, S5 & inductor $L_B$ operates as a second step-up DC-DC converter and similarly the switches S3, S6 & inductor $L_C$ operates as a third step-up DC-DC converter. These three step-up DC-DC converters are having a 120 deg. phase shift to reduce the total current ripple.

As a result, the present disclosure provides vehicle-to-vehicle charging with reduced losses resulting in a greater efficiency and lower charging times without the need of providing additional component. This is because, it is possible, e.g. by means of switching/controlling the switches of the power factor correction of the on-board charger of the first/source electric vehicle, that the DC power of the isolated DC-DC converter can be provided to the AC inlet of the first electric vehicle and then transmitted to the AC inlet of the second/load electric vehicle from which it can be directly provided to the energy storage system of the second electric vehicle.

Other variations to the disclosed embodiment can be understood and effected by those skilled in the art in practicing the claimed subject matter, from the study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A method for vehicle-to-vehicle charging for electric vehicles, comprising:
controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle; and
transferring the DC power from the first terminal L1 of the first electric vehicle to an energy storage system of a second electric vehicle, and from the second terminal L2 of the first electric vehicle to an energy storage system of a third electric vehicle.

2. The method according to claim 1, wherein the second electric vehicle and the third electric vehicle are charged simultaneously.

3. The method according to claim 1, wherein a voltage range of the energy storage system of the second electric vehicle and of the energy storage system of the third electric vehicle is smaller than a voltage range of the energy system of the first electric vehicle.

4. The method according to claim 1, wherein the voltage range of the energy storage system of the second electric vehicle and the voltage range of the energy storage system of the third electric vehicle are different.

5. The method according to claim 1, the charging current being controlled by controlling an isolated DC-DC converter of the bi-directional on-board charger of the first electric vehicle.

6. The method according to claim 1, a data communication being provided by means of a Powerline Communication (PLC) or CAN communication.

7. The method according to claim 1, the second and/or third electric vehicle comprising a DC-inlet, preferably being selected from the following: a CCS interface, a CHAdeMO interface and/or a GB/T interface.

8. The method according to claim 1, the DC power bypassing an on-board charger of the second electric vehicle.

9. The method according to claim 1, the bi-directional on-board charger of the first electric vehicle comprising at least one power factor correction unit and at least one isolated DC-DC converter.

10. The method according to claim 1, wherein the first electric vehicle is connected to the second electric vehicle and to the third electric vehicle by means of one multi-port unit, wherein the multi-port unit comprises a common neutral conductor and wherein the multi-port unit is configured to provide a communication between the first electrical vehicle and the second electrical vehicle and the third electrical vehicle.

11. The method according to claim 1, wherein the energy storage system of a fourth electric vehicle is charged by the first electric vehicle simultaneously to the second electric vehicle and third electric vehicle.

12. A computer program element comprising a non-transitory computer-readable medium comprising instructions stored in a memory which when executed by a processor are configured to carry out method steps comprising:
controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle; and
transferring the DC power from the first terminal L1 of the first electric vehicle to an energy storage system of a second electric vehicle, and from the second terminal L2 of the first electric vehicle to an energy storage system of a third electric vehicle.

13. An electric vehicle configured to carry out method steps comprising controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle and transferring the DC power from the first terminal L1 of the first electric vehicle to an energy storage system of a second electric vehicle, and from the second terminal L2 of the first electric vehicle to an energy storage system of a third electric vehicle, the electric vehicle comprising:
the three phase bi-directional on-board charger configured to provide the DC power from the energy storage system of the electric vehicle at the first terminal L1 and the second terminal L2 of the three phase bi-directional on board-charger of the electric vehicle.

14. A system for vehicle-to-vehicle charging configured to carry out method steps comprising controlling a three phase bi-directional on-board charger of a first electric vehicle to provide a DC power from an energy storage system of the first electric vehicle at a first terminal L1 and a second terminal L2 of the three phase bi-directional on board-charger of the first electric vehicle and transferring the DC power from the first terminal L1 of the first electric vehicle to an energy storage system of a second electric vehicle, and from the second terminal L2 of the first electric vehicle to an energy storage system of a third electric vehicle, the system comprising:
the three phase bi-directional on-board charger of the first electric vehicle;
the energy storage system of the first electric vehicle;
the energy storage system of the second electric vehicle;
the energy storage system of the third electric vehicle;
a multi-port unit configured to connect the three phase bi-directional on-board charger of the first electric vehicle and the energy storage system of the second electric vehicle and the energy storage system of a third electric vehicle; and a control unit configured to control the three phase bi-directional on-board charger of the first electric vehicle to provide the DC power from the energy storage system of the first electric vehicle at the first terminal L1 and the second terminal L2 of the three phase bi-directional on board-charger of the first electric vehicle.

* * * * *